May 19, 1959  E. H. FLETCHER ET AL  2,887,187
POWER BRAKE SYSTEM
Filed Nov. 23, 1956

INVENTORS
E. H. FLETCHER
R. A. WITTREN

United States Patent Office 2,887,187
Patented May 19, 1959

2,887,187

POWER BRAKE SYSTEM

Edward H. Fletcher and Richard A. Wittren, Cedar Falls, Iowa, assignors, by mesne assignments, to Deere & Company, a corporation of Delaware Application November 23, 1956, Serial No. 624,046

5 Claims. (Cl. 188—152)

This invention relates to vehicle brake means and more particularly to a power brake system for controlling fluid under pressure to one or more brakes.

This invention has for its principal objects the provision of an improved control for power brakes and the provision of means for operating the brakes manually in the event of a power failure. It is a further object of the invention to provide a construction in which a control piston is so designed and arranged to give the operator the proper amount of "feel" during power application of the brakes. The invention has for a further object the cross connection of a pair of master cylinders by means controlled by check valves arranged so that when both master cylinders are actuated the fluid flow therebetween is equalized.

The invention further features a simple and economical construction, together with other important objects and desirable features inherent therein and encompassed thereby as will appear from the ensuing specification and accompanying sheet of drawings, the figures of which are described immediately below.

The structure chosen for the purposes of illustration embodies a pair of master cylinders 10 and 12 formed in a unitary housing 14, which housing is supplemented by a rear housing or support 16 having therein coaxial extensions 18 and 20 respectively of the cylinders 10 and 12. From the standpoint of the broad aspects of the invention disclosed here, the housing structure is not material. Likewise such expressions as "front," "rear" etc. are used in the interests of convenience and not as limiting terms.

Figure 1:
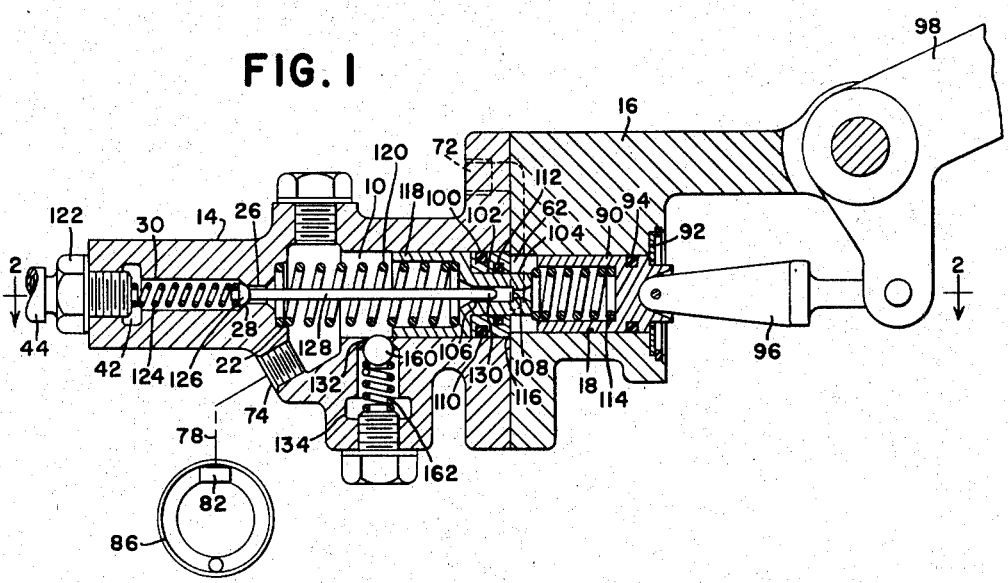
Fig. 1 is a longitudinal section through one of the master cylinders.

The cylinder 10 has front and rear ends 22 and 24 and is provided coaxially at its front end with a high-pressure inlet 26 which includes a valve seat 28 that connects the inlet 26 with a high-pressure passage 30. The cylinder 12 is similarly constructed and arranged, having front and rear ends 32 and 34, a high-pressure inlet 36 and a valve seat 38 which connects the inlet 36 with a high pressure passage 40. The two passages 30 and 40 are cross-connected at 42 and are supplied with fluid under pressure from a high-pressure line 44 connected to the housing 14 by a suitable fitting 46 which is closed by a spring-loaded check valve 48. The valve 48 is located loosely in a reservoir line 50 that is coaxial with the inlet fitting 46 and which includes a reduced portion 52 having a check valve seat 54 at its junction with the passage portion 50. A check valve 56 normally closes the seat 54 and a single spring 58 represents biasing means for maintaining the check valves closed. The rear end of the reservoir line 52 communicates with a cross passage 60 which opens at its opposite ends as reservoir outlets 62 and 64 respectively in communication with the master cylinders 10 and 12 adjacent to the rear ends thereof. The cross passage 60 is connected in any suitable manner to a reservoir line 66 which leads to the low side of a fluid pressure source including a reservoir 68 and a pump 70, the latter being connected to the high-pressure line 44. Fig. 1 illustrates in dotted lines a tapped bore 72 by means of which the reservoir passage 60 may be connected to the reservoir line 66.

At their forward ends, the master cylinders 10 and 12 are provided with brake outlets 74 and 76 which lead respectively via brake lines 78 and 80 to brake cylinders 82 and 84 for a pair of vehicle brakes illustrated schematically at 86 and 88.

The master cylinder 10 carries therein a normally rearwardly positioned plunger 90 which is advanceable in the cylinder from a rearward position against which it is stopped as by a washer and snap ring assembly 92. The plunger 90 is provided with an appropriate oil seal 94 and is advanceable in the cylinder 10, or at least the rear cylinder extension 18, by operating means including a compression link 96 and any suitable manually operable member, such as a brake pedal, a portion of which is shown at 98.

Spaced ahead of the plunger is a ring 100 which serves several purposes. Considered primarily as part of the cylinder, it affords an axial bore 102 of reduced diameter as respects the diameter of the master cylinder 10 and in this bore is mounted a control piston 104 which itself has a coaxial bore or passage 106 including a valve seat or port 108. The ring has an annular oil seal 110 between itself and the master cylinder 10 and has a second oil seal 112 which seals the bore 102 about the control piston 104.

The piston 104 normally extends rearwardly through the ring 100 and a yielding force-transmitting means in the form of a compression spring 114 acts between the piston and the plunger 90 so that advance of the plunger incurs advance of the piston. As will be seen, the spring 114 is recessed within the semi-hollow plunger so that the plunger has a limited amount of forward travel before the front face thereof contacts the ring 100. Since the ring is sealed at 110 to the internal cylindrical surface of the master cylinder 10, and further since the seal 112 between the ring and the piston 104 affords an oil tight junction, it may be expected that normally the ring 112 will remain in its rear position, at which it is stopped by a shoulder 116 afforded by the junction of the master cylinder 10 and its extension 18. In any event, and regardless of whether or not the ring 112 moves during that portion of the range of movement of the plunger 90 within the limits of the fore-and-aft space indicated, the ring is so positioned that it takes overtravel of the plunger 90 to forcibly move it.

The forward end of the piston 104 is in the form of a cup-shaped portion 118 of which the radial flange portion overlaps the front face of the ring 100. Biasing means, here a coiled compression spring 120, acts between the cup portion 118 and the front end 22 of the master cylinder 10 so as to urge the piston 104 normally rearwardly. Since the cup-like portion 118 abuts the front face of the ring 100, the biasing means also serves to keep the ring 100 normally in its rear position.

The high pressure passage 30 is preferably drilled from the front end of the housing 14 and the front end thereof is closed by a plug 122 against which a spring 124 reacts to normally close valve means 126 on the inlet valve seat 28. The valve means is part of a one-piece element including a stem 128 of which the rear end forms a second valve means 130 for controlling the piston valve seat 108.

Intermediate the normally positioned control piston 104 and brake outlet 74 is a port 132 which forms one end of a cross passage 134, the other end of which includes a port 136 that leads symmetrically to the other master cylinder 12 ahead of its control piston 138 and attached cup-like element 140. The relationship between the master cylinder 12 and its components is the same as that just described. For example, in addition to the control piston 138 and cup-like element 140, the master cylinder 12 contains a ring 142 like the ring 100, a plunger 144 like the plunger 90, a biasing spring 146, an inlet control valve 148 which has a valve stem 150, and a spring 152 which acts against the inlet valve 148 and a plug 154 like the plug 122. In addition to the components visible, the master cylinder is constructed exactly like the master cylinder 10 and its components. A link 156 forms operating means connected to a pedal 158, for example, individually operative as respects the pedal 98.

Figure 2:
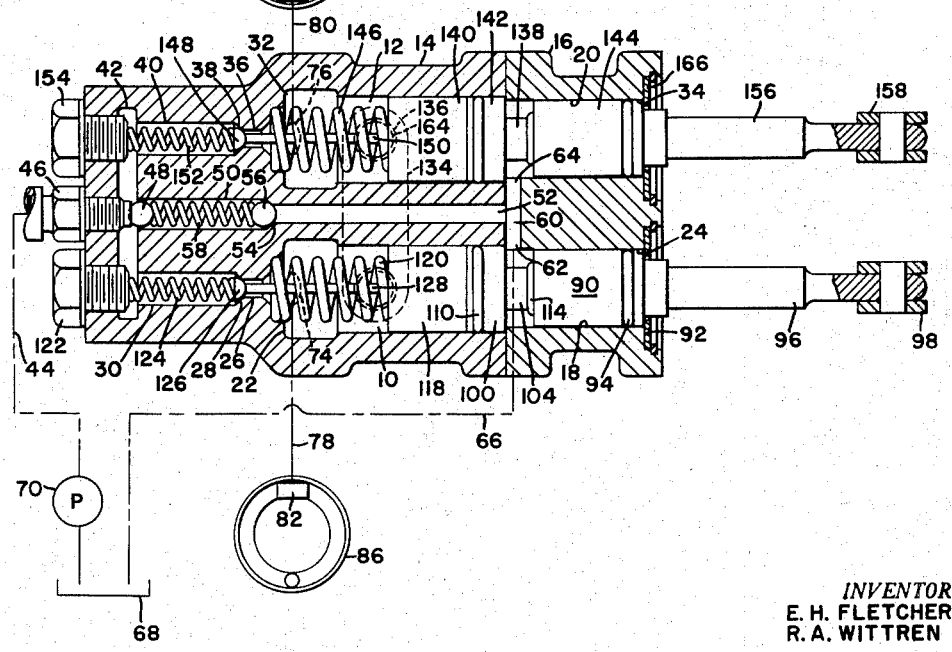
Fig. 2 is a horizontal section showing both master cylinders, the section being taken along the line 2—2 of Fig. 1.

The cross passage port 132 in the master cylinder 10 is normally closed by a check valve 160, loaded by a spring 162, to close in the direction of fluid flow into the cylinder 10. A second check valve 164 (dotted lines in Fig. 2) operates in the same fashion relative to the other port 136 for the master cylinder 12. In other words, these check valves when closed prevent transfer of fluid flow from one cylinder to the other so that even though a pressure rise in the master cylinder 10 might open the check valve 160, the other check valve 164 will prevent loss of this pressure to the cylinder 12, except when the check valve 164 is positively opened, as will appear below.

*Power operation*

As already indicated, the normal or inactive positions of the brake-actuating components, primarily the plungers 90 and 144, are rearward, against which they are stopped at 92 for the plunger 90 and 166 for the plunger 144. The pump 70 is here of the constant pressure type and the ball 48 is normally seated at the end of the fitting 46 by the spring 58 which, of course seats the reservoir line ball 56 at 54. When the pedal 98 is depressed, it acts through the link 96 to advance the plunger 90. The yielding force-transmitting means afforded by the spring 114 incurs advance of the piston 104. As the piston advances, the valve seat 108 therein approaches the valve formed by the rear end of the stem 130, and the passage through the piston is ultimately closed. When the piston picks up the valve stem 130, it shifts the entire valve means forwardly to unseat the inlet valve 126 so that fluid under pressure is admitted to the forward end of the cylinder 10 for exit to the brake cylinder 82 via the line 78. It will be noted that the cup-shaped element 118 on the forward end of the control piston 104 positively unseats the check valve 160 in the cross passage 134, but as long as the other element 140 remains in place, the other check valve 164 remains closed and no fluid pressure is transmitted to the other cylinder 12.

Of significance here is the fact that the cup-like element 118 is not sealed to the wall of the cylinder 10. Hence, the actual fluid-pressure receivable area of the piston 104 is that based on the diameter of the reduced portion contained within the bore 102 of the ring 100. The reason for the provision of this reduced area is to keep the "feel" or force opposing the brake pedal low during power braking. Hence, the large diameter portion of the piston afforded by the cup-like element 118 is simply to receive the rear end of the biasing spring 120.

When the brake pedal is released, the biasing spring 120 forces the piston 104 rearwardly, which incurs rearward movement or retraction of the plunger 90 and, if the ring 100 has moved forwardly with the piston 104, it likewise will be returned to its normal position.

When both pedals 98 and 158 are depressed simultaneously, the plungers 90 and 144 will advance in unison and the cup-like elements 118 and 140 will positively open both check valves 160 and 164 in the cross passage 134, thereby equalizing fluid pressure between the two cylinders so that even though one pedal is depressed further than the other the braking pressure will be the same for both brakes 86 and 88.

When the plunger 90 retracts, the inlet valve control spring 124 will of course close the inlet valve 126 and, as the piston 104 attains its rearward position, the valve 130 will open the piston passage port 108 to connect the interior of the cylinder to the reservoir at 62.

*Manual operation*

In the event of power failure, it is desirable that the brake system be capable of manual application. It is at this time that the ring 100 serves its second function, operating itself as a piston for expelling fluid from the cylinder 10 to the brake line 78 via the outlet 74. This action occurs during overtravel of the plunger 90, or travel of the plunger through a range is excess of the power-actuating range previously described. In other words, as the plunger 90 advances and picks up the lost motion, it forces the ring 100 forwardly, and since the ring 100 is sealed at 110 to the cylinder, it functions as a piston of large area, thus affording maximum force for manual application of the brake 86. During this phase of operation, the inlet valve 126 is opened but the fluid cannot be expelled back through the high-pressure line 44, because the valve 48 is closed. At the same time, the reservoir valve 56 is closed, as is the valve 148. Upon rearward movement of the ring 100, together with the piston 104 and plunger 90 to a limited extent, the inlet valve 126 remains open and reservoir fluid can be drawn into the front end of the cylinder via that open valve and the openable reservoir valve 56. Hence, the system has the ability to enable the operator to "pump up" the brakes during manual application.

The same functional details apply to individual application of the components of the master cylinder 12. Likewise, manual application of both brakes in unison is available by simultaneous advance of the plungers 90 and 144.

*Summary*

The construction illustrated involves but few relatively movable parts to accomplish the dual function of power and manual brake application. The design is simple and economical and requires little maintenance. The dual function of the rings 100 and 142 is significant, enabling reduction of the control piston area to afford proper feel during power application and enabling the ring to serve as a piston for manual application of the brakes.

Features and advantages other than those categorically enumerated will undoubtedly occur to those versed in the art, as will many modifications and alterations in the preferred structure disclosed, all of which may be achieved without departure from the spirit and scope of the invention.

What is claimed is:

1. In a fluid power brake system: a master cylinder having front and rear ends and a high pressure inlet adjacent to its front end; non-return means preventing reverse flow through the inlet; a normally rearwardly positioned plunger advanceable in the cylinder; a ring piston in the cylinder normally spaced ahead of the plunger; a reservoir outlet leading from the cylinder intermediate the ring piston and plunger; a control piston coaxially carried by the ring piston and having an axial passage therethrough; means sequentially operative upon advance of the plunger to advance the control piston and then the ring piston; means biasing the pistons rearwardly; a brake outlet leading from the cylinder ahead of the pistons; inlet valve means separate from the non-return means and normally closing the inlet; piston valve means normally opening the control piston passage; a reservoir line connected at one end to the reservoir outlet and connected at its other end to the inlet upstream of the inlet valve; a check valve in said line biased to close in the direction of high-pressure flow from the inlet to the reservoir outlet; and operating means movable through a first range to advance the plunger and control piston and to incur closing of the piston valve and opening of the inlet valve for admitting high-pressure fluid to the cylinder for exit through the brake outlet, said operating means being movable through a second range for advancing the ring piston, with the piston valve closed and the inlet valve open, to expel cylinder fluid through the brake outlet in the absence of high pressure inlet flow, said non-return means operating to prevent reverse flow through the inlet and said check valve in the reservoir line closing to prevent flow to the reservoir outlet upon advance of the ring piston and said check valve opening upon rearward return of the ring piston via the biasing means to enable reservoir fluid to be drawn into the cylinder through the open inlet valve.

2. In a fluid power brake system: means providing a master cylinder having front and rear ends and including a high-pressure inlet adjacent to said front end; a normally rearwardly positioned plunger advanceable in the cylinder; ring means operative as a piston in the cylinder and normally spaced ahead of the plunger for forward movement and having an axial bore therethrough; means providing a reservoir outlet leading to the cylinder between the plunger and ring means; a control piston in said bore and having a passage therethrough including a valve port; force-transmitting means between the piston and plunger enabling the plunger to initially advance the piston relative to the ring means; biasing means normally biasing the piston rearwardly; an inlet valve normally biased to close the high-pressure inlet; a piston valve normally uncovering the piston valve port; means interconnecting the valves for movement in unison; means providing a brake fluid outlet from the cylinder ahead of the piston; means for advancing the plunger to act via the force-transmitting means to initially advance the piston to incur closing of the piston valve and then opening of the inlet valve via said interconnecting means so that high-pressure fluid through the inlet enters the cylinder for transmission through the brake fluid outlet; and means engageable by the plunger and operative after predetermined forward travel of said plunger and control piston to engage the ring means for advancing said ring means to expel cylinder fluid through the brake outlet in the absence of high pressure fluid at said inlet.

3. The invention defined in claim 2 including: a cup-like element connected to the front end of the piston and having a radial flange overlapping the front of the ring, and the biasing means acts on the cup-like element to urge both the piston and the ring rearwardly.

4. In a fluid power brake system: means providing a pair of master cylinders, each having front and rear ends and including a high-pressure inlet coaxially at said front end; a normally rearwardly positioned plunger advanceable in each cylinder; ring means in each cylinder normally spaced ahead of the plunger and having a reduced axial bore; means providing a reservoir outlet leading to each cylinder between its plunger and ring means; a control piston in each reduced bore and having an axial passage therethrough including a valve port; yielding means between and normally separating each piston and its associated plunger; biasing means normally biasing each piston rearwardly; inlet valves normally biased rearwardly to close the high-pressure inlets; piston valves normally forwardly spaced from and respectively uncovering the piston valve ports; means in each cylinder interconnecting the associated piston valve and inlet valve for axial movement in unison; means providing brake fluid outlets from the cylinders respectively ahead of the pistons; means for individually advancing each plunger to act via its yielding means to advance its piston to incur closing of its piston valve and then opening of its inlet valve via its interconnecting means so that high-pressure fluid through the associated inlet enters its cylinder for transmission through its brake fluid outlet; a cross passage having first and second ends leading respectively to the cylinders; a first check valve in the first end of the cross passage biased to close said first end in the direction of fluid flow into the associated cylinder; a second check valve in the second end of the cross passage and biased to close in the direction of fluid flow into the other cylinder; and first and second means respectively operative upon advance of the pistons in said cylinders to positively open the respective check valves so as to equalize fluid flow between the cylinders.

5. In a fluid power brake system: a master cylinder having front and rear ends and a high pressure inlet adjacent to its front end; non-return means preventing reverse flow through the inlet; a normally rearwardly positioned plunger advanceable in the cylinder; a piston in the cylinder normally spaced ahead of the plunger and having an axial passage therethrough; a reservoir outlet leading from the cylinder intermediate the piston and plunger; means biasing the piston rearwardly; a brake outlet leading from the cylinder head ahead of the piston; inlet means separate from the non-return means and normally closing the inlet; piston valve means normally opening the piston passage; a reservoir line connected at one end to the reservoir outlet and connected at its other end to the inlet upstream of the inlet valve; a check valve in said line biased to close in the direction of high-pressure flow from the inlet to the reservoir outlet; means for advancing the plunger; yielding means between the plunger and piston enabling initial advance of the piston and plunger in unison; and positive means operative between the plunger and piston after said initial advance for superseding the yielding means and incurring further advance of the piston and plunger in unison, with the piston valve closed and the inlet valve open, to expel cylinder fluid through the brake outlet in the absence of high-pressure inlet flow, said non-return means operating to prevent reverse flow through the inlet and said check valve in the reservoir line closing to prevent flow to the reservoir outlet upon advance of the piston and said check valve opening upon rearward return of the piston via the biasing means to enable reservoir fluid to be drawn into the cylinder through the open inlet valve.

References Cited in the file of this patent

UNITED STATES PATENTS

| 2,068,150 | Oliver | Jan. 19, 1937 |
| 2,281,138 | Christensen | Apr. 28, 1942 |
| 2,698,205 | Gagen | Dec. 28, 1954 |

UNITED STATES PATENT OFFICE

CERTIFICATE OF CORRECTION

Patent No. 2,887,187                                                May 19, 1959

Edward H. Fletcher et al

It is hereby certified that error appears in the printed specification of the above numbered patent requiring correction and that the said Letters Patent should read as corrected below.

Column 6, line 35, after "inlet" insert -- valve --.

Signed and sealed this 6th day of October 1959.

(SEAL)
Attest:

KARL H. AXLINE                                                ROBERT C. WATSON
Attesting Officer                                          Commissioner of Patents